US010817122B1

(12) United States Patent
Huang

(10) Patent No.: US 10,817,122 B1
(45) Date of Patent: Oct. 27, 2020

(54) MULTI-TOUCH RESISTIVE TOUCH PANEL

(71) Applicant: Wistron Corporation, New Taipei (TW)

(72) Inventor: Kung-Chieh Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/581,772

(22) Filed: Sep. 25, 2019

(30) Foreign Application Priority Data

Aug. 6, 2019 (TW) .............................. 108127882 A

(51) Int. Cl.
*G06F 3/045* (2006.01)

(52) U.S. Cl.
CPC .... *G06F 3/045* (2013.01); *G06F 2203/04104* (2013.01)

(58) Field of Classification Search
CPC ........... G06F 3/045; G06F 2203/04104; G06F 2203/04808; G06F 3/041; G06F 3/0412; G06F 3/0416; H01L 29/45
See application file for complete search history.

(56) References Cited

U.S. PATENT DOCUMENTS

| 3,798,370 | A | * | 3/1974 | Hurst | G01B 7/004 |
| | | | | | 178/18.05 |
| 4,371,746 | A | * | 2/1983 | Pepper, Jr. | G10H 1/0558 |
| | | | | | 178/18.05 |
| 5,736,688 | A | * | 4/1998 | Barrett | G06F 3/045 |
| | | | | | 178/18.05 |
| 6,559,835 | B1 | * | 5/2003 | Randall | G06F 3/045 |
| | | | | | 178/18.05 |
| 9,658,730 | B2 | * | 5/2017 | Fang | G06F 3/045 |
| 2009/0322701 | A1 | * | 12/2009 | D'Souza | G06F 3/045 |
| | | | | | 345/174 |
| 2010/0164902 | A1 | * | 7/2010 | Yeh | G06F 3/045 |
| | | | | | 345/174 |

(Continued)

FOREIGN PATENT DOCUMENTS

| TW | M369505 | 11/2009 |
| TW | 201610804 | 3/2016 |

OTHER PUBLICATIONS

"Office Action of Taiwan Counterpart Application", dated Apr. 30, 2020, p. 1-p. 10.

*Primary Examiner* — Sanjiv D. Patel
(74) *Attorney, Agent, or Firm* — JCIPRNET

(57) ABSTRACT

A multi-touch resistive touch panel includes a first conductive substrate, a second conductive substrate and a microcontroller. The first conductive substrate includes four input terminals at or around four corners of the first conductive substrate. The second conductive substrate is disposed in parallel with and spaced apart from the first conductive substrate, and includes a plurality of output terminals at or around an edge of the second conductive substrate. The microcontroller is electrically coupled to the four input terminals and the plurality of output terminals, provides a first input voltage to two adjacent input terminals of the four input terminals, and provides a second input voltage to the other two adjacent input terminals of the four input terminals. The microcontroller calculates a coordinate value corresponding to at least one touch point according to an output voltage outputted by at least one of the plurality of output terminals.

19 Claims, 7 Drawing Sheets

(56) References Cited

U.S. PATENT DOCUMENTS

| | | | | |
|---|---|---|---|---|
| 2010/0309163 A1* | 12/2010 | Yeh | ............... | G06F 3/045 |
| | | | | 345/174 |
| 2015/0177980 A1* | 6/2015 | Yanase | ............... | G06F 3/044 |
| | | | | 345/174 |
| 2016/0154502 A1* | 6/2016 | Fujita | ............... | G06F 3/0416 |
| | | | | 345/174 |
| 2017/0068358 A1* | 3/2017 | Makiuchi | ............... | G06F 3/045 |
| 2017/0329447 A1* | 11/2017 | Kuefler | ............... | G06F 3/0416 |

\* cited by examiner

MULTI-TOUCH RESISTIVE TOUCH PANEL

CROSS-REFERENCE TO RELATED APPLICATION

This application claims the priority benefit of Taiwan application serial no. 108127882, filed on Aug. 6, 2019. The entirety of the above-mentioned patent application is hereby incorporated by reference herein and made a part of this specification.

BACKGROUND

Field of the Invention

The present invention relates to a touch panel, in particular to a multi-touch resistive touch panel.

Description of Related Art

Touch panels are roughly classified into capacitive touch panels, resistive touch panels and optical touch panels according to different sensing principles. Although capacitive touch panels are commonly used in displays of general consumer electronic products nowadays, in specific fields such as industrial or military electronic products or commercial machines with simple display operational interfaces, resistive touch panels are still popular. Basically, a general resistive touch panel includes two spaced conductive layers, and most resistive touch panels are four-wire or five-wire. In the resistive touch panel, according to a user's pressing, the two originally spaced conductive layers contact each other at a pressing position' and thus produces a resistance change. Therefore, the position where the user presses on the resistive touch panel can be calculated according to the resistance change. However, the general resistive touch panel only provides a one-point touch function, but cannot simultaneously sense touches at multiple points, and thus is limited in application. In view of this, solutions of several embodiments are proposed as below to implement a resistive touch panel with a multi-touch function.

SUMMARY OF THE INVENTION

The present invention provides a multi-touch resistive touch panel with a multi-point touch function.

One embodiment of a multi-touch resistive touch panel of the present invention includes a first conductive substrate, a second conductive substrate and a microcontroller. The first conductive substrate includes four input terminals arranged at or around four corners of the first conductive substrate. The second conductive substrate is arranged in parallel with the first conductive substrate and is spaced apart from the first conductive substrate. The second conductive substrate includes a plurality of output terminals arranged at or around an edge of the second conductive substrate. The microcontroller is electrically coupled to the four input terminals and the plurality of output terminals. The microcontroller is configured to provide a first input voltage to two adjacent input terminals of the four input terminals and provide a second input voltage to the other two adjacent input terminals of the four input terminals. The microcontroller calculates a coordinate value corresponding to at least one touch point applied on the multi-touch resistive touch panel according to an output voltage outputted by at least one of the plurality of output terminals.

One embodiment of a multi-touch resistive touch panel of the present invention includes a first conductive substrate and a second conductive substrate. The first conductive substrate includes four input terminals arranged at or around four corners of the first conductive substrate, wherein two adjacent input terminals are configured to receive a first input voltage, and the other two adjacent input terminals are configured to receive a second input voltage. The second conductive substrate is arranged in parallel with the first conductive substrate and is spaced apart from the first conductive substrate. The second conductive substrate includes four output terminals arranged at or around four corners of the second conductive substrate, wherein two adjacent output terminals are configured to output a first output voltage, and the other two adjacent output terminals are configured to output a second output voltage.

One embodiment of a multi-touch resistive touch panel of the present invention includes a first conductive substrate and a second conductive substrate. The first conductive substrate includes four input terminals arranged at or around four corners of the first conductive substrate, wherein two adjacent input terminals are configured to receive a first input voltage, and the other two adjacent input terminals are configured to receive a second input voltage. The second conductive substrate is arranged in parallel with the first conductive substrate and is spaced apart from the first conductive substrate. The second conductive substrate includes a first conducting wire and a second conducting wire arranged along two opposite sides of the second conductive substrate. The first conducting wire is electrically coupled to a first output terminal to output a first output voltage. The second conducting wire is electrically coupled to a second output terminal to output a second output voltage.

Based on the above, the multi-touch resistive touch panel provided by the present invention is provided with a plurality of output terminals on the second conductive substrate, and calculates the coordinate value corresponding to at least one touch point according to the output voltage outputted by at least one of the plurality of output terminals according to the number of touch points.

In order to make the aforementioned features and advantages of the present invention comprehensible, embodiments accompanied with figures are described in detail below.

DESCRIPTION OF THE EMBODIMENTS

Figure 1:
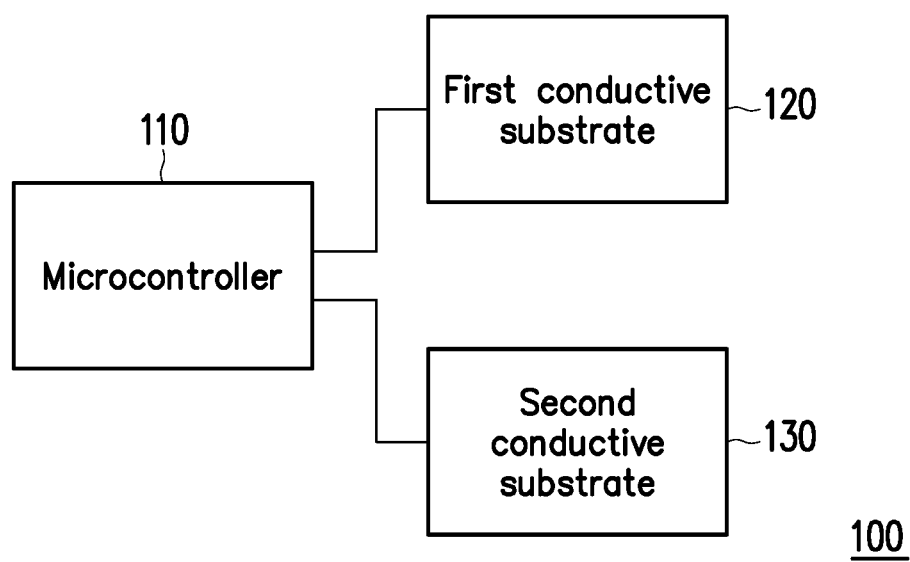
FIG. 1 is a schematic block diagram of a multi-touch resistive touch panel according to one embodiment of the present invention.

In order to make the content of the present invention more comprehensible, embodiments are described below as examples of implementation of the present invention. However, but the present invention is not limited to the embodiments. The embodiments can also be combined properly. Wherever possible, the same reference numerals are used in the drawings and the description to refer to the same or like parts, components or steps. For parts, components or steps denoted by same reference numerals or names, reference can be made to the related descriptions.

FIG. 1 is a schematic block diagram of a multi-touch resistive touch panel according to one embodiment of the present invention. Referring to FIG. 1, a multi-touch resistive touch panel 100 includes a microcontroller 110, a first conductive substrate 120 and a second conductive substrate 130. The microcontroller 110 is electrically coupled to the first conductive substrate 120 and the second conductive substrate 130. The first conductive substrate 120 is arranged in parallel with and is spaced apart from the second conductive substrate 130. Each conductive substrate is mainly a conductive layer where a material such as indium tin oxide (ITO) is laid on a sheet substrate, wherein the substrate is, for example, a polymer polyester film (PET) or glass, but is not limited thereto. Various existing materials are used as the substrates and conductive layers by one skilled in the art. In the first conductive substrate 120 and the second conductive substrate 130 in the present invention, substrates and conductive layers made of the same or different materials may be employed to form a conductive film or conductive glass; however, in the embodiments of the present invention, the first conductive substrate 120 and the second conductive substrate 130 employ substrates and conductive layers made of the same materials, for simplification and exemplary purposes. In the present embodiment, the first conductive substrate 120 includes four input terminals arranged at or around four corners (since a conductive substrate is generally rectangular in shape; however, the number of corners is not limited to four) of the first conductive substrate 120, and the second conductive substrate 130 includes a plurality of output terminals arranged at or around an edge of the second conductive substrate 130. In the present embodiment, the microcontroller 110 is electrically coupled to the four input terminals and the plurality of output terminals.

In the present embodiment, the microcontroller 110 provides a first input voltage to two adjacent input terminals of the four input terminals, and provides a second input voltage to the other two adjacent input terminals of the four input terminals. The first input voltage is different from the second input voltage, such that a stepwise potential change occurs on a surface of the first conductive substrate 120 between the two pairs of input terminals due to a voltage difference. Therefore, the microcontroller 110 obtains a coordinate value corresponding to at least one touch point applied on the multi-touch resistive touch panel 100 according to an output voltage outputted by at least one of the plurality of output terminals. In this regard, exemplary embodiments of an eight-wire resistive touch panel and a six-wire resistive touch panel are provided below for further description.

In the present embodiment, the microcontroller 110 is, for example, formed by integrating a central processing unit (CPU), a memory and various input-output interfaces onto an integrated circuit chip, and the present invention is not limited thereto. In the present embodiment, the microcontroller 110 is configured to provide different input voltages to the four input terminals of the first conductive substrate 120, and read out the output voltage outputted by at least one of the plurality of output terminals of the second conductive substrate 130. In addition, the microcontroller 110 calculates at least one coordinate value corresponding to at least one touch point according to at least one output voltage.

Figure 2:
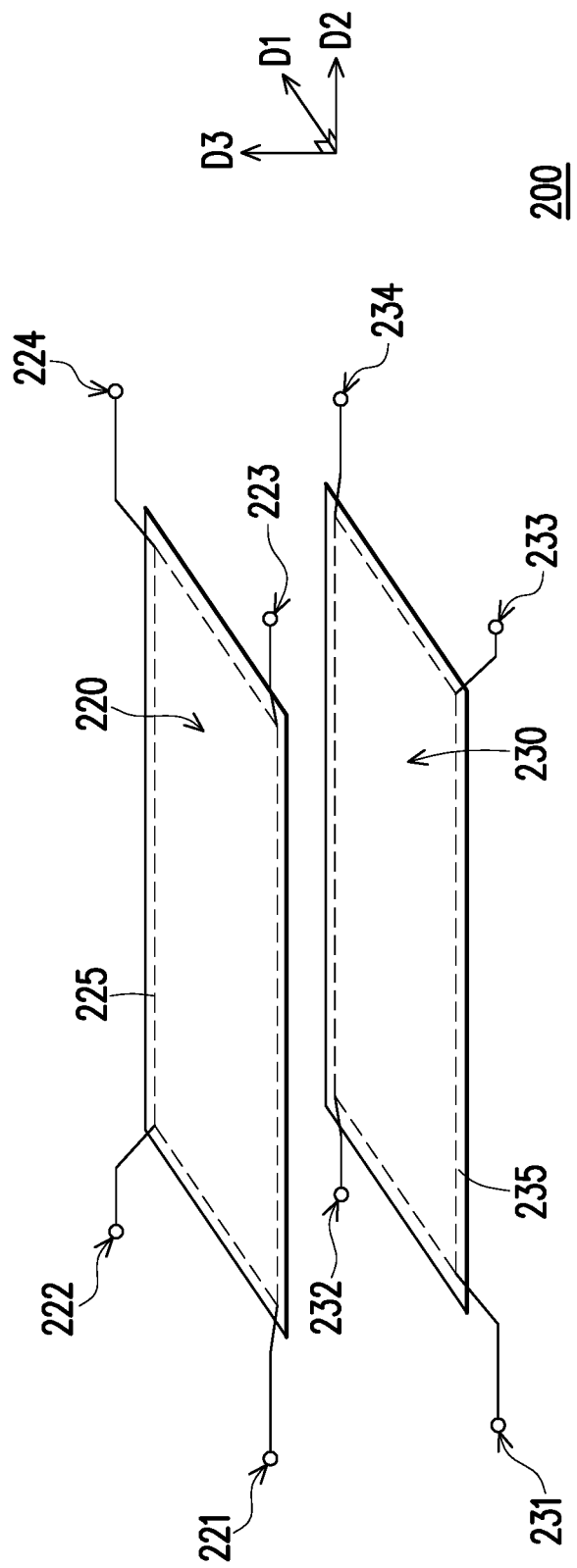
FIG. 2 is a schematic structural view of an eight-wire resistive touch panel according to one embodiment of the present invention.

FIG. 2 is a schematic structural view of an eight-wire resistive touch panel according to one embodiment of the present invention. Referring to FIG. 2, a multi-touch resistive touch panel 200 includes a first conductive substrate 220 and a second conductive substrate 230, and the first conductive substrate 220 and the second conductive substrate 230 are electrically coupled to, for example, the microcontroller in the embodiment illustrated in FIG. 1. It is noteworthy that the multi-touch resistive touch panel 200 in the present embodiment has a structure of the eight-wire resistive touch panel, and realizes at least one-point and two-point functions. In the present embodiment, the first conductive substrate 220 and the second conductive substrate 230 are respectively arranged in parallel with planes extending from a first direction D1 and a second direction D2, and a plurality of spacers are further arranged between the first conductive substrate 220 and the second conductive substrate 230 such that a fixed spacing is maintained in a third direction D3 between the first conductive substrate 220 and the second conductive substrate 230. In the present embodiment, the first direction D1, the second direction D2 and the third direction D3 are perpendicular to one another. In addition, FIG. 2 is a schematic diagram of the main structure of the multi-touch resistive touch panel 200. The multi-touch resistive touch panel 200 may further include other touch panel components, which are not limited to those illustrated in FIG. 2.

In the present embodiment, the first conductive substrate 220 includes four input terminals 221-224 sequentially arranged at or around four corners of the first conductive substrate 220 and a first discontinuous conductor 225 arranged around an edge of the first conductive substrate 220, and four corners of the first discontinuous conductor 225 are electrically coupled one-to-one to the input terminals 221-224. The first discontinuous conductor 225 adjusts and homogenizes a potential change on a surface of a conductive substrate. In the present embodiment, the input terminals 221, 222 are adjacent along the first direction D1, and the input terminals 223, 224 are adjacent along the first direction D1. The input terminals 221, 223 are adjacent along the second direction D2, and the input terminals 222, 224 are adjacent along the second direction D2.

In the present embodiment, the second conductive substrate 230 includes four output terminals 231-234 sequentially arranged at or around four corners of the second conductive substrate 230 and a second discontinuous conductor 235 arranged around an edge of the second conductive substrate 230, and four corners of the second discontinuous conductor 235 are electrically coupled one-to-one to the output terminals 231-234. The second discontinuous conductor 235 adjusts and homogenizes a potential change on the conductive substrate. In the present embodiment, the output terminals 231, 232 are adjacent along the first direction D1, and the output terminals 233, 234 are adjacent along the first direction D1. The output terminals 231, 233 are adjacent along the second direction D2, and the output terminals 232, 234 are adjacent along the second direction D2.

In the present embodiment, by pressing the first conductive substrate 220 with a finger or stylus, a user enables the first conductive substrate 220 to contact the second conductive substrate 230 in the third direction D3 at a position corresponding to a single touch point, so as to form a short circuit and a resistance change. Taking one-point touch as an example, coordinates of the touch point are (x1, y1), for example. When the multi-touch resistive touch panel 200 is used in a one-point touch operation, the microcontroller short-circuits the input terminals 221, 222 which are adjacent along the first direction D1 (e.g., corresponding to a Y-axis direction) and inputs the first input voltage, and short-circuits the input terminals 223, 224 which are adjacent along the first direction D1 and inputs the second input voltage. Under the condition that the first conductive substrate 220 is made of an ideal one-dimensional uniform material, the first conductive substrate 220 forms a uniform potential distribution. Therefore, the microcontroller calculates the coordinate value x1 corresponding to the single touch point in the second direction D2 (e.g., corresponding to an X-axis direction) by reading out the output voltage outputted by one of the output terminals 231-234.

Further, the microcontroller changes to short-circuit the input terminals 221, 223 which are adjacent along the second direction D2 and inputs the first input voltage, and changes to short-circuit the input terminals 222, 224 which are adjacent along the second direction D2 and inputs the second input voltage. Therefore, the microcontroller further calculates the coordinate value y1 corresponding to the single touch point in the first direction D1 by reading out the output voltage outputted by one of the output terminals 231-234.

Taking two-point touch as an example, coordinates of two touch points are respectively (x1, y1) and (x2, y2), for example. When the multi-touch resistive touch panel 200 is used in a two-point touch operation, the microcontroller short-circuits the input terminals 221, 222 which are adjacent along the first direction D1 and inputs the first input voltage, and short-circuits the input terminals 223, 224 which are adjacent along the first direction D1 and inputs the second input voltage. Moreover, the microcontroller short-circuits the output terminals 231, 232, and short-circuits the output terminals 233, 234. The microcontroller reads out a first output voltage outputted by the output terminals 231, 232, and reads out a second output voltage outputted by the output terminals 233 and 234. Therefore, the microcontroller calculates the two coordinate values x1 and x2 corresponding to the two touch points in the second direction D2 according to the first output voltage and the second output voltage.

Further, the microcontroller changes to short-circuit the input terminals 221, 223 which are adjacent along the second direction D2 and inputs the first input voltage, and changes to short-circuit the input terminals 222, 224 which are adjacent along the second direction D2 and inputs the second input voltage. The microcontroller reads out a third output voltage outputted by the output terminals 231, 232 and a fourth output voltage outputted by the output terminals 233, 234. Therefore, the microcontroller calculates the two coordinate values y1 and y2 corresponding to the two touch points in the first direction D1 according to the third output voltage and the fourth output voltage.

Figure 3A:
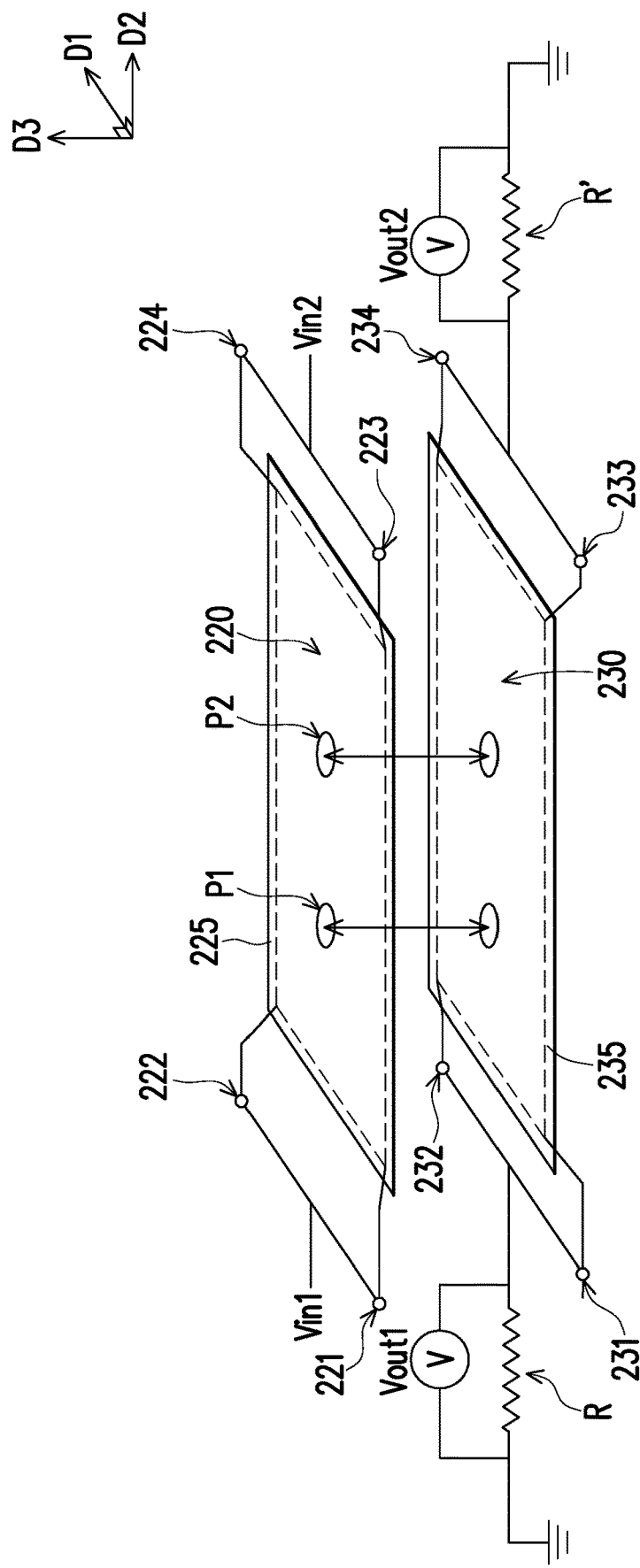
FIG. 3A is a schematic view of calculating coordinate values of two touch points in a second direction according to the embodiment illustrated in FIG. 2 of the present invention.
Figure 3B:
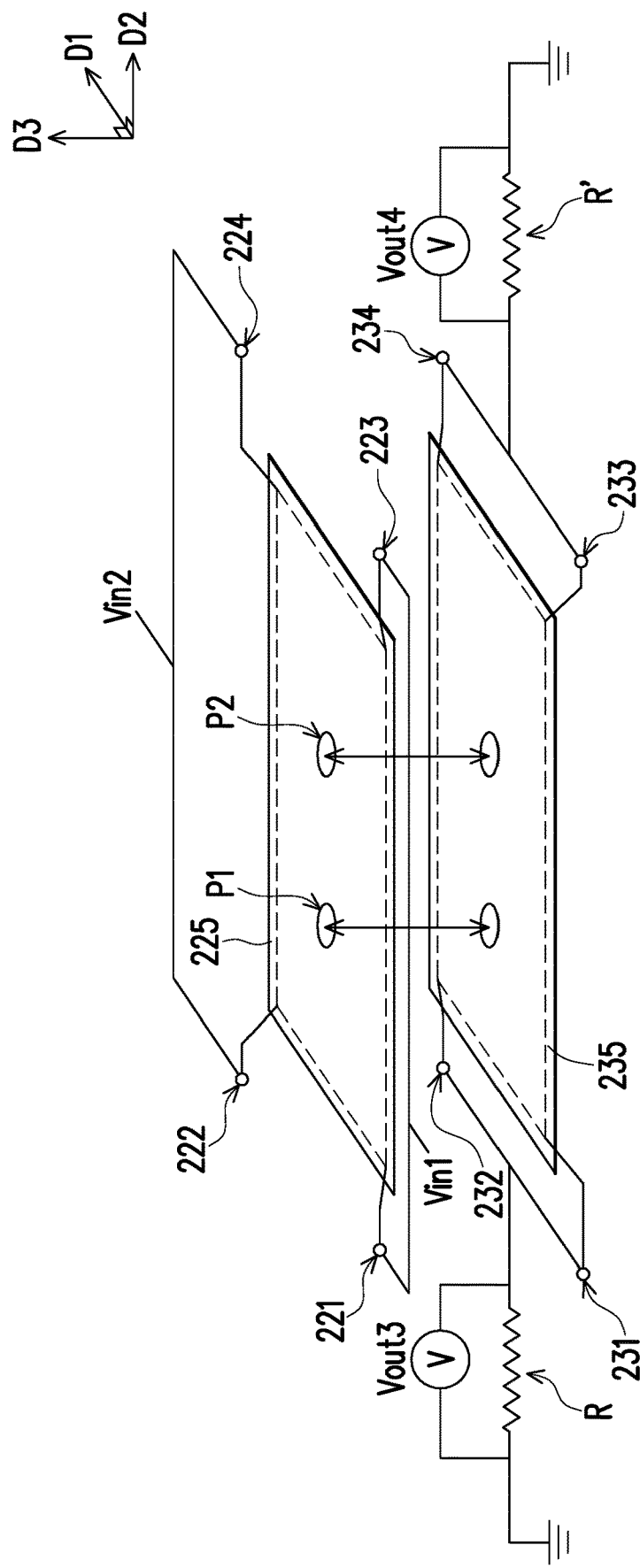
FIG. 3B is a schematic view of calculating coordinate values of two touch points in a first direction according to the embodiment illustrated in FIG. 2 of the present invention.

FIG. 3A is a schematic view of calculating coordinate values of two touch points in a second direction according to the embodiment illustrated in FIG. 2 of the present invention. FIG. 3B is a schematic view of calculating coordinate values of two touch points in a first direction according to the embodiment illustrated in FIG. 2 of the present invention. Firstly referring to FIG. 3A, the microcontroller short-circuits the input terminals 221, 222 and inputs a first input voltage Vin1, and short-circuits the input terminals 223, 224 and inputs a second input voltage Vin2. The first input voltage Vin1 is different from the second input voltage Vin2, such that the first conductive substrate 220 forms a uniform stepwise potential change in the second direction D2. In one embodiment, the first input voltage Vin1 is, for example, 5 volts (V), and the second input voltage Vin2 is, for example, 0 volt. Moreover, the microcontroller short-circuits the output terminals 231, 232, and short-circuits the output terminals 233, 234. Therefore, when two touch points P1 and P2 are applied on the multi-touch resistive touch panel 200, the first conductive substrate 220 contacts the second conductive substrate 230 in the third direction D3 at positions corresponding to the touch points P1 and P2 to form a short circuit and a resistance change.

In the present embodiment, the microcontroller reads out a first output voltage Vout1 outputted by the output terminals 231, 232 according to a cross voltage of a resistor R by, for example, electrically coupling the output terminals 231, 232 to the resistor R with a high resistance value, and also reads out a second output voltage Vout2 outputted by the output terminals 233, 234 according to a cross voltage of another resistor R' by, for example, electrically coupling the output terminals 233, 234 to the resistor R' with a high resistance value. Accordingly, the microcontroller effectively calculates two coordinate values (e.g., two coordinate values on the X-axis) of the touch points P1 and P2 in the second direction D2 according to the first output voltage Vout1 and the second output voltage Vout2.

Then referring to FIG. 3B, the microcontroller short-circuits the input terminals 221, 223 and inputs the first input voltage Vin1, and short-circuits the input terminals 222, 224 and inputs the second input voltage Vin2. The first input voltage Vin1 is different from the second input voltage Vin2, such that the first conductive substrate 220 forms a uniform stepwise potential change in the first direction D1. Moreover, the microcontroller short-circuits the output terminals 231, 232, and short-circuits the output terminals 233, 234. Therefore, when the two touch points P1 and P2 are applied on the multi-touch resistive touch panel 200, the first conductive substrate 220 contacts the second conductive substrate 230 in the third direction D3 at the positions corresponding to the touch points P1 and P2 to form a short circuit and a resistance change. The microcontroller similarly reads out a third output voltage Vout3 outputted by the output terminals 231, 232 according to the cross voltage of the resistor R by electrically coupling the output terminals 231, 232 to the resistor R, and similarly reads out a fourth output voltage Vout4 outputted by the output terminals 233, 234 according to the cross voltage of the resistor R' by electrically coupling the output terminals 233, 234 to the resistor R'. Accordingly, the microcontroller effectively calculates two coordinate values (e.g., two coordinate values on the Y-axis) of the touch points P1 and P2 in the first direction D1 according to the third output voltage Vout3 and the fourth output voltage Vout4.

Figure 4:
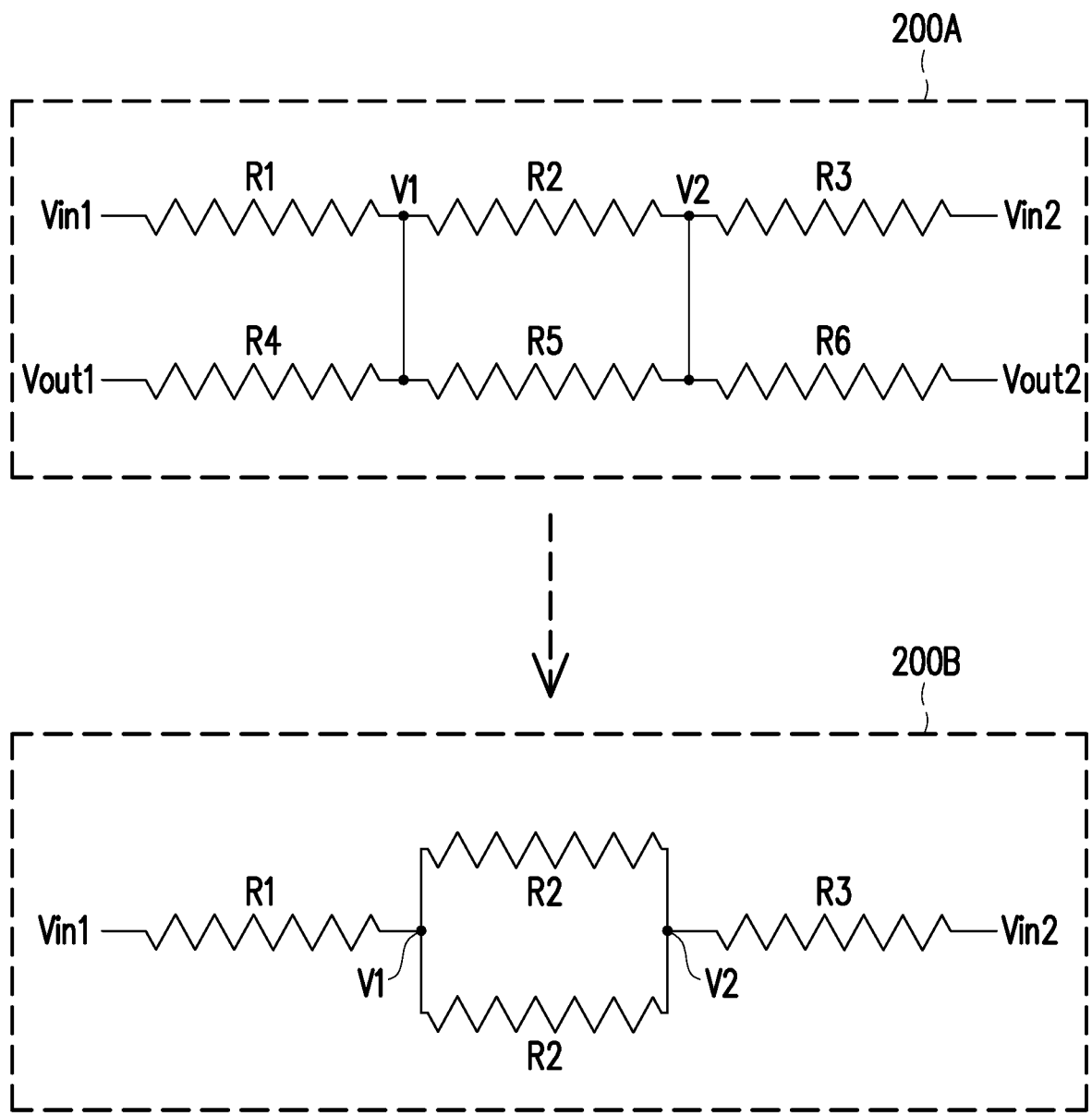
FIG. 4 is a schematic equivalent circuit diagram of calculating coordinate values of two touch points in the second direction according to the embodiment illustrated in FIG. 3A of the present invention.

FIG. 4 is a schematic equivalent circuit diagram of calculating coordinate values of two touch points in a second direction according to the embodiment illustrated in FIG. 3A of the present invention. Referring to FIG. 3A and FIG. 4, FIG. 4 shows, for example, a derivation of an equivalent circuit in which the first conductive substrate 220 and the second conductive substrate 230 have the two touch points P1 and P2. The coordinates of the touch point P1 are assumed to be (x1, y1), and the coordinates of the touch point P2 are assumed to be (x2, y2). In the present embodiment, firstly, an equivalent circuit 200A includes resistors R1-R6 and node voltages V1, V2. In detail, the input terminals 221, 222 are short-circuited and receive the first input voltage Vin1. The input terminals 223, 224 are short-circuited and receive the second input voltage Vin2. The output terminals 231, 232 are short-circuited, and the output terminals 233, 234 are short-circuited. The first conductive substrate 220 and the second conductive substrate 230 form a short circuit at the positions of the touch point P1 and P2, and have voltages V1 and V2 respectively. Therefore, along the second direction D2, the first conductive substrate 220 is divided into three sections according to the two touch points P1 and P2, and these three sections correspond to equivalent resistors R1-R3. Furthermore, along the second direction D2, the second conductive substrate 230 is similarly divided into three sections according to the two touch points P1 and P2, and these three sections correspond to equivalent resistors R4-R6.

However, in the present embodiment, the output terminals 231, 232 are, for example, electrically coupled to the resistor R with a high resistance value, and the output terminals 233, 234 are, for example, electrically coupled to the resistor R' with a high resistance value. Since the resistors R, R' are both designed to have much higher resistance than the equivalent resistors R4, R6, the resistors R4, R6 may be ignored. The first output voltage Vout1 is approximate to the voltage V1, and the second output voltage Vout2 is approximate to the voltage V2. Moreover, since conductive properties of the first conductive substrate 220 and the second conductive substrate 230 are the same or in a fixed proportional relationship, if the conductive properties of the first conductive substrate 220 and the second conductive substrate 230 are the same, the resistors R2, R5 are regarded as the same. Accordingly, the equivalent circuit 200A is further simplified as an equivalent circuit 200B, and the microcontroller effectively calculates the resistors R1, R3 according to results of the equivalent circuit 200B.

In detail, assuming that the first input voltage Vin1 is v volt and the second input voltage Vin2 is 0 volt, the voltages V1, V2 of the equivalent circuit 200B satisfy the following formulas (1), (2).

$$V1 = v * \left(1 - \frac{R1}{R1 + \frac{1}{2}R2 + R3}\right) \quad (1)$$

$$V2 = v * \left(\frac{R1}{R1 + \frac{1}{2}R2 + R3}\right) \quad (2)$$

Then, according to a relation formula between the overall substrate resistor R of the first conductive substrate 220 and the equivalent resistors R1-R3 as shown by the following formula (3), the formulas (1), (2) are further rewritten as the following formulas (4), (5).

$$R = R1 + R2 + R3 \quad (3)$$

$$R1 = \left(\frac{-2vR}{V2}\right) \Big/ \left(\frac{2v}{v - V1} + \frac{2v}{V2} - \frac{4v^2}{(v - V1)*V2}\right) \quad (4)$$

$$R3 = \left(\frac{2vR}{V1 - v}\right) \Big/ \left(\frac{2v}{v - V1} + \frac{2v}{V2} - \frac{4v^2}{(v - V1)*V2}\right) \quad (5)$$

Finally, it is assumed that the first conductive substrate 220 and the second conductive substrate 230 have a length L in the first direction D1, and the input terminal 221 (analogically, the output terminal 231) is defined to be at the origin coordinates (0, 0). The first direction D1 serves as the Y-axis direction, and the second direction D2 serves as the X-axis direction. Therefore, the formulas (4) and (5) are further rewritten as formulas (6) and (7) to obtain the two coordinate values x1 and x2 corresponding to the touch points P1 and P2 in the second direction D2.

$$x1 = \frac{R1}{R}*L = \left(\frac{-2vL}{V2}\right) \Big/ \left(\frac{2v}{v - V1} + \frac{2v}{V2} - \frac{4v^2}{(v - V1)*V2}\right) \quad (6)$$

$$x2 = \left(1 - \frac{R3}{R}\right)*L = L - \left(\left(\frac{2vL}{V1 - v}\right) \Big/ \left(\frac{2v}{v - V1} + \frac{2v}{V2} - \frac{4v^2}{(v - V1)*V2}\right)\right) \quad (7)$$

By analogy, in the embodiment of FIG. 3B, the input terminals 221, 223 are short-circuited and receive the first input voltage Vin1. The input terminals 222, 224 are short-circuited and receive the second input voltage Vin2. In other words, along the first direction D1, the first conductive substrate 220 is divided into three sections according to the two touch points P1 and P2, and these three sections correspond to three equivalent resistors. Furthermore, along the first direction D1, the second conductive substrate 230 is divided into three sections according to the two touch points P1 and P2, and these three sections correspond to the other three equivalent resistors. Therefore, by making a similar deduction to that of formula (1) to formula (7) above, the two coordinate values y1 and y2 corresponding to the touch points P1 and P2 in the first direction D1 are obtained.

Figure 5:
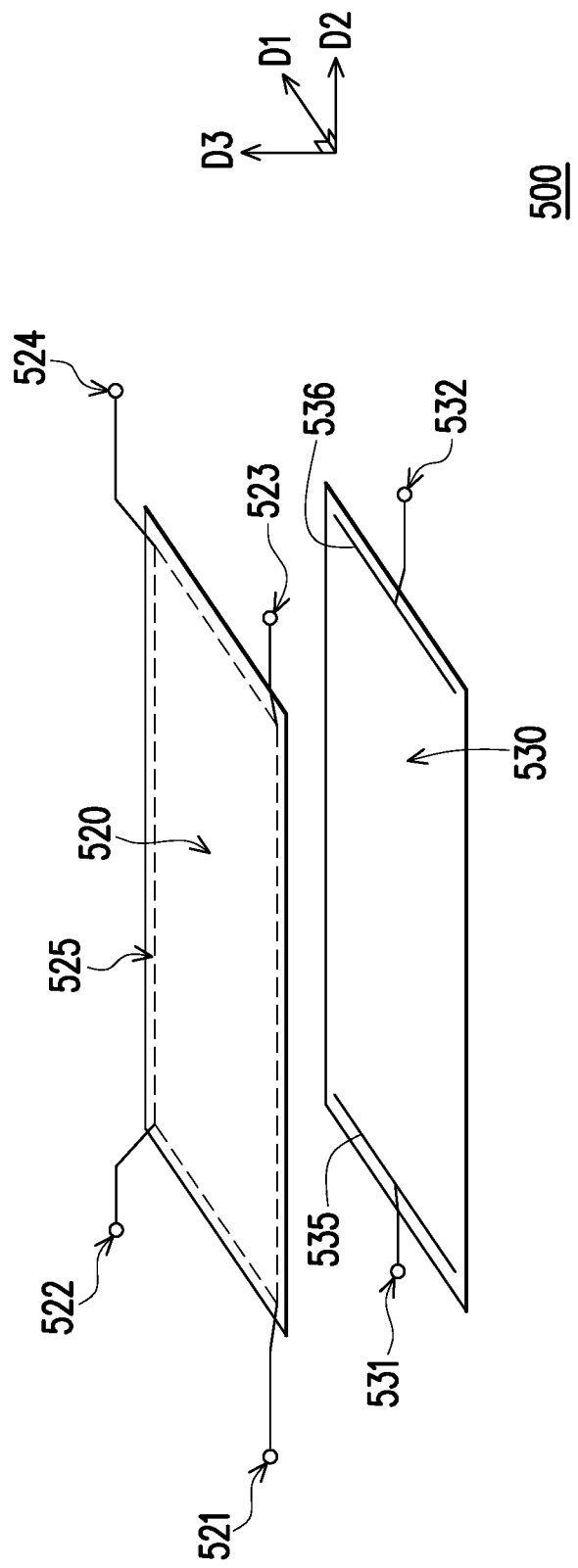
FIG. 5 is a schematic structural view of a six-wire resistive touch panel according to one embodiment of the present invention.

FIG. 5 is a schematic structural view of a six-wire resistive touch panel according to one embodiment of the present invention. Referring to FIG. 5, a multi-touch resistive touch panel 500 includes a first conductive substrate 520 and a second conductive substrate 530, and the first conductive substrate 520 and the second conductive substrate 530 are electrically coupled to, for example, the microcontroller in the embodiment illustrated in FIG. 1. It is noteworthy that the multi-touch resistive touch panel 500 in the present embodiment has a structure of the six-wire resistive touch panel, and realizes at least one-point and two-point touch functions. In the present embodiment, the first conductive substrate 520 and the second conductive substrate 530 are respectively arranged in parallel with the planes extending from the first direction D1 and the second direction D2, and a plurality of spacers are further arranged between the first conductive substrate 520 and the second conductive substrate 530, such that a fixed spacing is maintained between the first conductive substrate 520 and the second conductive substrate 530 in the third direction D3. In the present embodiment, the first direction D1, the second direction D2 and the third direction D3 are perpendicular to one another.

In the present embodiment, the first conductive substrate 520 includes four input terminals 521-524 sequentially arranged at or around four corners of the first conductive substrate 520 and a first discontinuous conductor 525 arranged around an edge of the first conductive substrate 520, and four corners of the first discontinuous conductor 525 are electrically coupled one-to-one to the input terminals 521-524. The first discontinuous conductor 525 adjusts and homogenizes a potential change on a conductive substrate. In the present embodiment, the input terminals 521, 522 are adjacent along the first direction D1, and the input terminals 523, 524 are adjacent along the first direction D1. The input terminals 521, 523 are adjacent along the second direction D2, and the input terminals 522 and 524 are adjacent along the second direction D2. In the present embodiment, the second conductive substrate 530 includes conducting wires 535, 536 arranged along two opposite sides of the second conductive substrate 530. The conducting wire 535 is electrically coupled to an output terminal 531, and the conducting wire 536 is electrically coupled to an output terminal 532.

In the present embodiment, by pressing the first conductive substrate 520 with a finger or stylus, the user enables the first conductive substrate 520 to contact the second conductive substrate 530 in the third direction D3 at a position corresponding to a single touch point, so as to form a short circuit and a resistance change. Taking one-point touch as an example, coordinates of the touch point are (x1, y1). When the multi-touch resistive touch panel 500 is used in a one-point touch operation, the microcontroller short-circuits the input terminals 521, 522 which are adjacent along the first direction D1 (e.g., corresponding to the Y-axis direction) and inputs the first input voltage, and short-circuits the input terminals 523, 524 which are adjacent along the first direction D1 and inputs the second input voltage. Under the condition that the first conductive substrate 520 is made of an ideal one-dimensional uniform material, the first conductive substrate 520 forms a uniform potential distribution. Therefore, the microcontroller calculates the coordinate value x1 corresponding to the single touch point in the second direction D2 by reading out the output voltage outputted by the output terminal 531 or output terminal 532.

Further, the microcontroller changes to short-circuit the input terminals 521, 523 which are adjacent along the second direction D2 and inputs the first input voltage, and changes to short-circuit the input terminals 522, 524 which are adjacent along the second direction D2 and inputs the second input voltage. Therefore, the microcontroller further calculates the coordinate value y1 corresponding to the single touch point in the first direction D1 by reading out the output voltage outputted by the output terminal 531 or output terminal 532.

Taking two-point touch as an example, coordinates of two touch points are respectively (x1, y1) and (x2, y2). When the multi-touch resistive touch panel 500 is used in a two-point touch operation, the microcontroller short-circuits the input terminals 521, 522 which are adjacent along the first direction D1 and inputs the first input voltage, and short-circuits the input terminals 523, 524 which are adjacent along the first direction D1 and inputs the second input voltage. Furthermore, the microcontroller reads out the first output voltage outputted by the output terminal 531 and the second output voltage outputted by the output terminal 532. Therefore, the microcontroller calculates the two coordinate values x1 and x2 corresponding to the two touch points in the second direction D2 according to the first output voltage and the second output voltage. Further, the microcontroller changes to short-circuit the input terminals 521, 523 which are adjacent along the second direction D2 and inputs the first input voltage, and changes to short-circuit the input terminals 522, 524 which are adjacent along the second direction D2 and inputs the second input voltage. The microcontroller reads out the third output voltage outputted by the output terminal 531 and the fourth output voltage outputted by the output terminal 532. Therefore, the microcontroller calculates the two coordinate values y1 and y2 corresponding to the two touch points in the first direction D1 according to the third output voltage and the fourth output voltage.

In addition, for details of the electrical coupling manner of the input terminals and the calculation method of the first direction D1 and the second direction D2 in the present embodiment, enough teaching, suggestion and implementation description may be obtained by reference and analogy to the descriptions of the embodiments illustrated in FIG. 2 to FIG. 4, and repeated descriptions are thus omitted herein.

Figure 6:
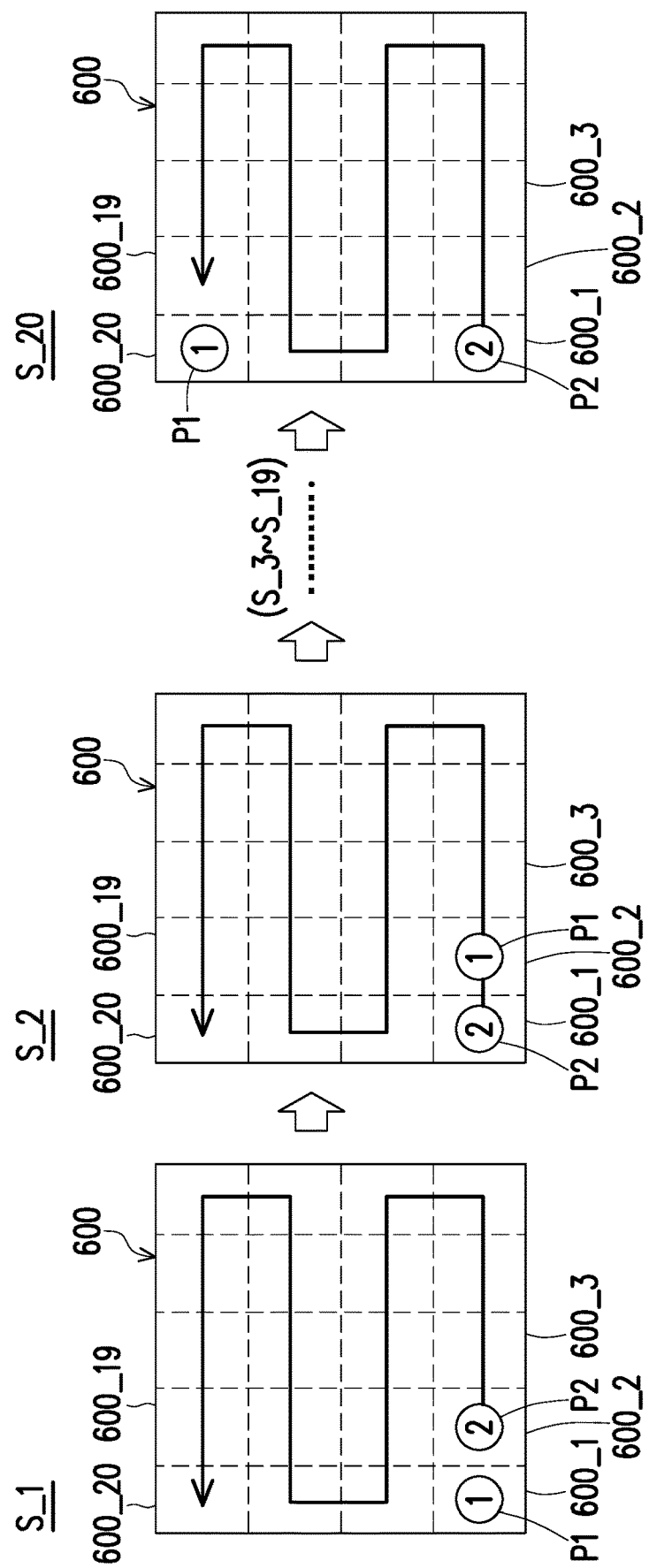
FIG. 6 is a schematic flowchart of obtaining a correction factor according to one embodiment of the present invention.

FIG. 6 is a schematic flowchart of obtaining a correction factor according to one embodiment of the present invention. In one embodiment, if the first conductive substrates 220, 520 or the second conductive substrates 230, 530 of the touch panels 200, 500 in the embodiments illustrated in FIG. 2 and FIG. 5 are made of a non-ideal one-dimensional uniform material, the first conductive substrates 220, 520 or the second conductive substrates 230, 530 will not form a uniform potential distribution. In other words, the coordinate values calculated in the above embodiments may deviate. In this regard, the microcontroller in the present embodiment records a plurality of correction factors in advance. When a touch panel 600 is used for touch sensing, according to a touch position, a microcontroller of the touch panel 600 automatically selects a corresponding correction factor and corrects a coordinate value.

Taking two-point touch as an example, referring to FIG. 6, the touch panel 600 is divided into 20 sub-touch areas 600_1-600_20. In step S_1, the user presses centers of the sub-touch areas 600_1, 600_2 to form two touch points. Furthermore, the touch panel 600 calculates two uncorrected coordinates corresponding to the two touch points according to the method in the embodiments illustrated in FIG. 3A and FIG. 3B. The uncorrected coordinates are, for example, (x1, y1) and (x2, y2), and the actual coordinates are, for example, (x1', y1') and (x2', y2'). Then, the microcontroller calculates the correction factors respectively corresponding to the coordinate values according to the two uncorrected coordinates (x1, y1) and (x2, y2) and the two corresponding actual coordinates (x1', y1') and (x2', y2').

For example, the microcontroller may divide each coordinate value of the two uncorrected coordinates (x1, y1) and (x2, y2) by each coordinate value of the actual coordinates (x1', y1') and (x2', y2') which are actually obtained in advance of the centers of the sub-touch areas 600_1 and 600_2, to directly obtain the correction factors corresponding to the uncorrected coordinates (x1, y1) and (x2, y2) of the centers of the sub-touch areas 600_1 and 600_2. In one embodiment, an operation program in the microcontroller establishes four equations corresponding to unknown correction factors of the coordinate values of the actual coordinates (x1', y1') and (x2', y2'), and the microcontroller performs an operation of solving simultaneous equations on the four equations to obtain the correction factors corresponding to the coordinate values.

By analogy, in step S_1, the user continues to press the centers of the sub-touch areas 600_1 and 600_3, and continues to the next combination until pressing the centers of the sub-touch areas 600_1 and 600_20. Therefore, the microcontroller obtains correction factors of a plurality of pressing combinations. Next, in step S_2, the user continues to press the centers of the sub-touch areas 600_2 and 600_3, then presses the centers of the sub-touch areas 600_2 and 600_4 and continues to the next combination until pressing the centers of sub-touch areas 600_2 and 600_20. Next, step S_3 to step S_19 are performed in this way. Finally, in step S_20, the user continues to press the centers of the sub-touch areas 600_20 and 600_1, then presses the centers of the sub-touch areas 600_20 and 600_2 and continues to the next combination until pressing the centers of the sub-touch areas

600_20 and 600_19. Therefore, the microcontroller obtains the correction factors of all the pressing combinations. In addition, in another embodiment, the microcontroller may further perform an interpolation operation on the correction factors obtained as above or increase the number of correction factors through machine learning, so as to improve correction resolution.

In another embodiment, however, since the coordinate value of the actual coordinates (x1', y1') and (x2', y2') corresponding to the two touch points are respectively related to the coordinate value of the uncorrected coordinates (x1, y1) and (x2, y2) corresponding to the two touch points, the operation program in the microcontroller may establish four equations corresponding to the four coordinate values of the actual coordinates (x1', y1') and (x2', y2'), and the microcontroller performs an operation of solving simultaneous equations on the four equations (four unknowns x1', y1', x2', and y2'). In detail, firstly, as shown by the following formulas (8) to (11), because the coordinate value of the actual coordinates (x1', y1') and (x2', y2') are respectively related to the coordinate values of the uncorrected coordinates (x1, y1) and (x2, y2'), for the coordinate values of the actual coordinates (x1', y1') and (x2', y2'), the following formulas (8) to (11) may be established.

$$x1'=f(x1,y1,x2,y2) \quad (8)$$

$$y1'=g(x1,y1,x2,y2) \quad (9)$$

$$x2'=h(x1,y1,x2,y2) \quad (10)$$

$$y2'=j(x1,y1,x2,y2) \quad (11)$$

Next, as illustrated in FIG. 3A and FIG. 3B, since the first output voltage Vout1, the second output voltage Vout2, the third output voltage Vout3 and the fourth output voltage Vout4 have a one-to-one corresponding relationship with the uncorrected coordinates (x1, y1) and the uncorrected coordinates (x2, y2), and the uncorrected coordinates (x1, y1) and the uncorrected coordinates (x2, y2) also have a one-to-one corresponding relationship with the actual coordinates (x1', y1') and the actual coordinates (x2', y2'), it can be seen that the first output voltage Vout1, the second output voltage Vout2, the third output voltage Vout3 and the fourth output voltage Vout4 each have a one-to-one corresponding relationship with the actual coordinates (x1', y1') and the actual coordinates (x2', y2'). Therefore, in this example, the microcontroller may directly use the first output voltage Vout1, the second output voltage Vout2, the third output voltage Vout3 and the fourth output voltage Vout4 to obtain the actual coordinates (x1', y1') and (x2', y2') without using the uncorrected coordinates (x1, y1) and (x2, y2). For the coordinate values of the actual coordinates (x1', y1') and (x2', y2'), the following formulas (12) to (15) may be established:

$$x1':=k(Vout1,Vout2,Vout3,Vout4) \quad (12)$$

$$y1'=m(Vout1,Vout2,Vout3,Vout4) \quad (13)$$

$$x2'=n(Vout1,Vout2,Vout3,Vout4) \quad (14)$$

$$y2'=p(Vout1,Vout2,Vout3,Vout4) \quad (15)$$

In other words, when the touch panel 600 is used in a one-point touch or multi-point touch operation, the microcontroller of the touch panel 600 reads one or more correction factors according to one or more sub-touch areas corresponding to one or more touch points, so as to correct the coordinate values of one or more touch points according to the one or more corresponding correction factors. However, the correction factor corresponding to each coordinate value in the present invention is not limited to being obtained through the above calculation method. In one embodiment, since a correction factor of each coordinate value of a two-point touch is related to four coordinate values of two touch points, the microcontroller of the touch panel 600 also establishes four equations corresponding to the four coordinate values, and performs an operation of solving simultaneous equations on the four equations and four unknown correction factors to obtain the correction factor corresponding to each coordinate value. In another embodiment, the microcontroller of the touch panel 600 directly calculates the actual coordinate values of one or more touch points according to a plurality of output voltages.

Based on the above, the multi-touch resistive touch panel provided by the present invention is implemented at least in the six-wire or eight-wire form, and has a multi-point touch function. The multi-touch resistive touch panel provided by the present invention is provided with a plurality of output terminals on the second conductive substrate, and calculates coordinate values corresponding to at least one touch point according to the output voltage outputted by at least one of the plurality of output terminals according to the number of touch points. In addition, the multi-touch resistive touch panel provided by the present invention records the correction factors corresponding to the coordinate values in advance, so as to effectively overcome the problem of coordinate deviation caused by a non-uniform one-dimensional linear material of the conductive substrate.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A multi-touch resistive touch panel, comprising:
a first conductive substrate, comprising four input terminals arranged at or around four corners of the first conductive substrate;
a second conductive substrate, arranged in parallel with the first conductive substrate, spaced apart from the first conductive substrate, and comprising a plurality of output terminals arranged at or around an edge of the second conductive substrate; and
a microcontroller, electrically coupled to the four input terminals and the plurality of output terminals and configured to provide a first input voltage to two adjacent input terminals of the four input terminals and provide a second input voltage to the other two adjacent input terminals of the four input terminals,
wherein the microcontroller calculates a first coordinate value in a second direction and a second coordinate value in a first direction for each touch point applied on the multi-touch resistive touch panel according to two output voltages outputted by at least one of the plurality of output terminals,
wherein the microcontroller calculates the first coordinate value along the second direction when the first input voltage and the second input voltage are provided along the first conductive substrate in the second direction and the two output voltages are output along the second conductive substrate in the second direction;

wherein the microcontroller calculates the second coordinate value along the first direction when the first input voltage and the second input voltage are provided along the first conductive substrate in the first direction and the two output voltages are output along the second conductive substrate in the second direction; and wherein the first direction is perpendicular to the second direction.

2. The multi-touch resistive touch panel according to claim 1, wherein the first conductive substrate further comprises a first discontinuous conductor arranged around an edge of the first conductive substrate, and four corners of the first discontinuous conductor are electrically coupled one-to-one to the four input terminals.

3. The multi-touch resistive touch panel according to claim 1, wherein the second conductive substrate comprises a first output terminal, a second output terminal, a third output terminal and a fourth output terminal sequentially arranged at or around four corners of the second conductive substrate, wherein the first output terminal and the second output terminal are adjacent along the first direction, the third output terminal and the fourth output terminal are adjacent along the first direction, the first output terminal and the third output terminal are adjacent along the second direction, and the second output terminal and the fourth output terminal are adjacent along the second direction.

4. The multi-touch resistive touch panel according to claim 3, wherein the second conductive substrate further comprises a second discontinuous conductor arranged around the edge of the second conductive substrate, and four corners of the second discontinuous conductor are electrically coupled one-to-one to the four output terminals.

5. The multi-touch resistive touch panel according to claim 3, wherein the microcontroller short-circuits a first input terminal and a second input terminal which are adjacent along the first direction and inputs the first input voltage, and short-circuits a third input terminal and a fourth input terminal which are adjacent along the first direction and inputs the second input voltage, wherein the microcontroller calculates the first coordinate value and the second coordinate value corresponding to the at least one touch point in the second direction according to the output voltages outputted by at least one of the plurality of output terminals.

6. The multi-touch resistive touch panel according to claim 5, wherein when two touch points are applied on the multi-touch resistive touch panel, the microcontroller short-circuits the first output terminal and the second output terminal, and short-circuits the third output terminal and the fourth output terminal, and accordingly reads out a first output voltage outputted by the first output terminal and the second output terminal, and reads out a second output voltage outputted by the third output terminal and the fourth output terminal, wherein the microcontroller calculates the first coordinate value and the second coordinate value corresponding to the two touch points in the second direction according to the first output voltage and the second output voltage.

7. The multi-touch resistive touch panel according to claim 3, wherein the microcontroller short-circuits a first input terminal and a third input terminal which are adjacent along the second direction and inputs the first input voltage, and short-circuits a second input terminal and a fourth input terminal which are adjacent along the second direction and inputs the second input voltage, wherein the microcontroller calculates the first coordinate value and the second coordinate value corresponding to the at least one touch point in the first direction according to the output voltages outputted by at least one of the plurality of output terminals.

8. The multi-touch resistive touch panel according to claim 7, wherein when two touch points are applied on the multi-touch resistive touch panel, the microcontroller short-circuits the first output terminal and the second output terminal, and short-circuits the third output terminal and the fourth output terminal, and accordingly reads out a fifth output voltage outputted by the first output terminal and the second output terminal, and reads out a sixth output voltage outputted by the third output terminal and the fourth output terminal, wherein the microcontroller calculates the first coordinate value and the second coordinate value corresponding to the two touch points in the first direction according to the fifth output voltage and the sixth output voltage.

9. The multi-touch resistive touch panel according to claim 1, wherein the second conductive substrate comprises a first conducting wire and a second conducting wire arranged along two opposite sides of the second conductive substrate, the first conducting wire is electrically coupled to a first output terminal, and the second conducting wire is electrically coupled to a second output terminal.

10. The multi-touch resistive touch panel according to claim 9, wherein when two touch points are applied on the multi-touch resistive touch panel, the microcontroller short-circuits a first input terminal and a second input terminal which are adjacent along the first direction and inputs the first input voltage, and short-circuits a third input terminal and a fourth input terminal which are adjacent along the first direction and inputs the second input voltage, and accordingly reads out a first output voltage outputted by the first output terminal, and reads out a second output voltage outputted by the second output terminal, wherein the microcontroller calculates the first coordinate value and the second coordinate value corresponding to the two touch points in the second direction according to the first output voltage and the second output voltage.

11. The multi-touch resistive touch panel according to claim 9, wherein when two touch points are applied on the multi-touch resistive touch panel, the microcontroller short-circuits a first input terminal and a third input terminal which are adjacent along the second direction and inputs the first input voltage, and short-circuits a second input terminal and a fourth input terminal which are adjacent along the second direction and inputs the second input voltage, and accordingly reads out a third output voltage outputted by the first output terminal, and reads out a fourth output voltage outputted by the second output terminal, wherein the microcontroller calculates the first coordinate value and the second coordinate value corresponding to the two touch points in the first direction according to the third output voltage and the fourth output voltage.

12. The multi-touch resistive touch panel according to claim 1, wherein the first input voltage is different from the second input voltage.

13. The multi-touch resistive touch panel according to claim 1, wherein the first conductive substrate and the second conductive substrate are each one of a transparent conductive film and conductive glass.

14. The multi-touch resistive touch panel according to claim 1, wherein the microcontroller obtains the output voltage according to a cross voltage of an output resistor electrically coupled to at least one of the plurality of output terminals.

15. The multi-touch resistive touch panel according to claim 1, wherein the microcontroller records in advance a plurality of correction factors corresponding to a plurality of sub-touch areas of the resistive touch panel, and the microcontroller is configured to read at least one correction factor according to at least one sub-touch area corresponding to the at least one touch point to correct the first coordinate value and the second coordinate value of the at least one touch point according to the at least one correction factor.

16. A multi-touch resistive touch panel, comprising:
a first conductive substrate, comprising four input terminals arranged at or around four corners of the first conductive substrate, wherein two adjacent input terminals are configured to receive a first input voltage, and the other two adjacent input terminals are configured to receive a second input voltage; and
a second conductive substrate, arranged in parallel with the first conductive substrate, spaced apart from the first conductive substrate, and comprising four output terminals arranged at or around four corners of the second conductive substrate, wherein two adjacent output terminals are configured to output a first output voltage, and the other two adjacent output terminals are configured to output a second output voltage,
wherein the first output voltage and the second output voltage are used to calculate the first coordinate value along a second direction when the first input voltage and the second input voltage are provided along the first conductive substrate in the second direction and the first and second output voltages are output along the second conductive substrate in the second direction;
wherein the first output voltage and the second output voltage are used to calculate a second coordinate value along a first direction when the first input voltage and the second input voltage are provided along the first conductive substrate in the first direction and the first and second output voltages are output along the second conductive substrate in the second direction; and
wherein the first direction is perpendicular to the second direction.

17. The multi-touch resistive touch panel according to claim 16, wherein the first conductive substrate comprises a first discontinuous conductor arranged around an edge of the first conductive substrate, four corners of the first discontinuous conductor are electrically coupled one-to-one to the four input terminals, the second conductive substrate comprises a second discontinuous conductor arranged around the edge of the first conductive substrate, and four corners of the second discontinuous conductor are electrically coupled one-to-one to the four output terminals.

18. A multi-touch resistive touch panel, comprising:
a first conductive substrate, comprising four input terminals arranged at or around four corners of the first conductive substrate, wherein two adjacent input terminals are configured to receive a first input voltage, and the other two adjacent input terminals are configured to receive a second input voltage; and
a second conductive substrate, arranged in parallel with the first conductive substrate, spaced apart from the first conductive substrate, and comprising a first conducting wire and a second conducting wire arranged along two opposite sides of the second conductive substrate, wherein the first conducting wire is electrically coupled to a first output terminal to output a first output voltage, and the second conducting wire is electrically coupled to a second output terminal to output a second output voltage,
wherein the first output voltage and the second output voltage are used to calculate the first coordinate value along a second direction when the first input voltage and the second input voltage are provided along the first conductive substrate in the second direction and the first and second output voltages are output along the second conductive substrate in the second direction;
wherein the first output voltage and the second output voltage are used to calculate a second coordinate value along a first direction when the first input voltage and the second input voltage are provided along the first conductive substrate in the first direction and the two output voltages are output along the second conductive substrate in a second direction; and
wherein the first direction is perpendicular to the second direction.

19. The multi-touch resistive touch panel according to claim 18, wherein the first conductive substrate comprises a first discontinuous conductor arranged around an edge of the first conductive substrate, and four corners of the first discontinuous conductor are electrically coupled one-to-one to the four input terminals.

* * * * *